(12) United States Patent
Park

(10) Patent No.: US 10,369,494 B2
(45) Date of Patent: Aug. 6, 2019

(54) SALT PRODUCTION AUTOMATION SYSTEM UTILIZING THREE-DIMENSIONALLY STRUCTURED EVAPORATION FIELDS

(71) Applicant: Yong Hee Park, Incheon (KR)

(72) Inventor: Yong Hee Park, Incheon (KR)

( * ) Notice: Subject to any disclaimer, the term of this patent is extended or adjusted under 35 U.S.C. 154(b) by 117 days.

(21) Appl. No.: 15/535,872

(22) PCT Filed: Nov. 6, 2015

(86) PCT No.: PCT/KR2015/011933
§ 371 (c)(1),
(2) Date: Jun. 14, 2017

(87) PCT Pub. No.: WO2016/076579
PCT Pub. Date: May 19, 2016

(65) Prior Publication Data
US 2018/0021694 A1    Jan. 25, 2018

(30) Foreign Application Priority Data
Nov. 12, 2014  (KR) .................. 10-2014-0157221

(51) Int. Cl.
*B01D 9/00* (2006.01)
*C02F 1/14* (2006.01)
(Continued)

(52) U.S. Cl.
CPC .......... *B01D 9/0018* (2013.01); *A23L 27/40* (2016.08); *B01D 9/0059* (2013.01); *C01D 3/06* (2013.01); *C02F 1/14* (2013.01); *A23V 2002/00* (2013.01); *B01D 2009/0086* (2013.01); *C02F 2103/08* (2013.01); *Y02A 20/128* (2018.01); *Y02A 20/212* (2018.01); *Y02W 10/37* (2015.05)

(58) Field of Classification Search
CPC .......... C02F 1/14; C01D 3/06; B01D 9/0018; B01D 9/0059
See application file for complete search history.

(56) References Cited

FOREIGN PATENT DOCUMENTS

| KR | 20100005160 | 5/2010 |
|---|---|---|
| KR | 101056446 | 11/2011 |

(Continued)

OTHER PUBLICATIONS

International Search Report—PCT/KR2015/011933 dated Feb. 3, 2016.

*Primary Examiner* — Brian A McCaig
(74) *Attorney, Agent, or Firm* — Cantor Colburn LLP

(57) ABSTRACT

Provided a salt production automation system utilizing three-dimensionally structured evaporation fields. The salt production automation system utilizing three-dimensionally structured evaporation fields includes: evaporation fields which have collection pools (SWT) and are installed in at least two separate places; a plurality of evaporation members which are three-dimensionally arranged in the evaporation fields to make seawater flow downwards; and a seawater supply unit which supplies seawater to the evaporation members so that seawater can flow downwards from the evaporation members, wherein among the evaporation fields, the number of evaporation members gradually decreases from the first stage evaporation field to the final stage evaporation field.

11 Claims, 4 Drawing Sheets

(51) Int. Cl.
  *C01D 3/06* (2006.01)
  *A23L 27/40* (2016.01)
  *C02F 103/08* (2006.01)

(56) References Cited

FOREIGN PATENT DOCUMENTS

| KR | 101085446 | * 11/2011 | ............. A23L 27/40 |
| KR | 20130063309 | 6/2013 | |
| KR | 101319835 | 10/2013 | |
| KR | 101383565 | 4/2014 | |

* cited by examiner

SALT PRODUCTION AUTOMATION SYSTEM UTILIZING THREE-DIMENSIONALLY STRUCTURED EVAPORATION FIELDS

TECHNICAL FIELD

The present invention relates to a salt production automation system utilizing three-dimensionally structured evaporation fields. More particularly, the present invention relates to a salt production automation system utilizing three-dimensionally structured evaporation fields, the system being capable of reducing a site area for salt farm equipment for extracting salt and increasing salt productivity by increasing the evaporation speed of seawater, using a plurality of seawater evaporation members that is three-dimensionally installed in a seawater evaporation field so that seawater evaporates while flowing down on the evaporation members, and a method of evaporating seawater.

BACKGROUND ART

In general, a method of extracting natural salt by bringing seawater into a salt field and then drying (evaporating) the seawater is generally used to produce salt. In other words, salt is obtained by drawing seawater into a substantially rectangular retention pond with a tiled, plastic, or ceramic ground, allowing the seawater to be naturally evaporated by sunlight to deposit salts on the ground, and collecting common salt and natural salt remaining after evaporating the seawater. The natural salt or common salt extracted by evaporation of seawater contain magnesium and small amounts of various minerals, so they are known as being healthy for human.

However, according to the method of producing salt by bringing and evaporating seawater in a salt farm, salt is produced through a process whereby seawater brought into substantially retention ponds continuously installed evaporates while sequentially flowing over the retention ponds. Further, the method of producing salt from seawater requires a relatively wide area for a salt farm, considering the evaporation speed of seawater. Accordingly, it is difficult to construct a salt farm within a limited site in some cases and it becomes more difficult to ensure salt sites due to coastal development. Further, it is difficult to suddenly increase retention ponds when there is a large demand and suddenly decrease retention ponds when there is a small amount of demand due to the limited salt sites. Therefore, it is inefficient to manage productivity of salt and the salt productivity (output per unit time) is decreased by reduction of evaporation speed of seawater.

Meanwhile, there is a method of hanging evaporation sheets (diapers) on ropes in several steps to increase the evaporation rate of seawater by increasing surface areas and of installing a hoist on top to move up/down the evaporation sheet blocks and increase the density of seawater in a retention pond at the bottom.

However, according to this structure for evaporating seawater, resistance is increased when it is a windy day, so the equipment (including the evaporation sheets) is damaged. Further, if the structure for evaporating seawater is small, it does not matter, but when it is large, the evaporation sheets are blown and damaged by strong wind such as in a typhoon. Therefore, the structure cannot be constructed in a large size.

It is possible to reduce the evaporation time of seawater as much as possible by increasing the evaporation efficiency by exposing seawater to sunlight and air and allowing the seawater to move. In order to effectively evaporate seawater by spraying the seawater to evaporation ropes, it is required to make the seawater flow down. Therefore, there is a strong need for a configuration that can maximize evaporation efficiency by making seawater flow down and minimize salt production time by installing a plurality of three-dimensional seawater evaporation members in a plurality of seawater evaporation fields.

DISCLOSURE

Technical Problem

An object of the present invention is to provide a salt production automation system utilizing three-dimensionally structured evaporation fields, the system being able to reducing a site for facilities for extracting salt of a salt farm and maximize efficiency and economic efficiency of salt production by increasing the evaporation speed of seawater. In particular, the present invention provides salt production automation system utilizing three-dimensionally structured evaporation fields that can increase the production speed of salt by increasing the evaporation speed of seawater through evaporation fields, by three-dimensionally installing a plurality of seawater evaporation members so that seawater evaporates while flowing down, dividing a seawater evaporation field into several evaporation fields such as first, second, and third evaporation fields, and gradually decreasing the number of the seawater evaporation members three-dimensionally installed at each of the seawater evaporation fields. Further, the present invention provides a salt production automation system utilizing three-dimensionally structured evaporation fields, the system being able to considerably reduce time, manpower, and personnel expenses for producing salt and provide various useful functions by increasing the production speed of salt beyond comparison to the related art using a specific structure that allows seawater to evaporate while flowing down on the seawater evaporation members three-dimensionally installed at the seawater evaporation fields. The present invention provides a salt production automation system utilizing three-dimensionally structured evaporation fields, the system being able to considerably quickly product salt and contribute to extracting healthy and tasty natural salt.

Technical Solution

In order to achieved the objects of the present invention, a salt production automation system utilizing three-dimensionally structured evaporation fields of the present invention includes: an evaporation field having a retention pond; a plurality of evaporation members three-dimensionally disposed to allow seawater to flow down; a seawater supply unit supplying seawater to the evaporation members so that the seawater flows down over the evaporation members; and a seawater circulation unit supplying the seawater flowing down in the retention pond of the evaporation field to a seawater tank of the seawater supply unit to supply seawater back to the evaporation members from the seawater tank.

Advantageous Effects

Accordingly, as compared with the existing facilities that take considerable time to produce salt from seawater, according to the present invention, seawater is sequentially supplied to a plurality of separated evaporation fields and evaporation members (the first evaporation member to the third evaporation member) are three-dimensionally installed at each of the evaporation fields, so the evaporation speed of seawater is increased and the time for producing salt is considerably reduced. Therefore, it is possible to reduce the size for the facilities for extracting salt at a salt farm and maximize efficiency and economic efficiency of producing salt.

Further, since the sizes of the seawater evaporation fields are reduced in preparation for the evaporation amount of seawater and the numbers of the evaporation members are also decreased in preparation for the amount of seawater after evaporating at the evaporation fields, the evaporation speed of seawater is increased, so it is possible to quickly produce salt and minimize the scale of a size for extracting salt. That is, the evaporation speed of seawater and the production speed of salt are remarkably increased and the site for extracting salt is significantly reduced, as compared with the related art.

BEST MODE

A salt production automation system utilizing three-dimensionally structured evaporation fields of the present invention includes: an evaporation field having a retention pond; a plurality of evaporation members three-dimensionally disposed in the evaporation field to allow seawater to flow down; a seawater supply unit supplying seawater to the evaporation members so that the seawater flows down on the evaporation members; and a seawater circulation unit supplying the seawater flowing down in the retention pond of the evaporation field to a seawater tank of the seawater supply unit to supply seawater back to the evaporation members from the seawater tank. The evaporation field is configured to receive water, which supplied to the evaporation members from the seawater supply unit and flows down on the evaporation members, in the retention pond and the retention pond has a collection pool for collecting the seawater flowing down on the evaporation members. The seawater circulation unit includes: a salinometer for measuring the concentration of seawater collected in the collection pool; a circulation pipe connected to the seawater tank from the collection pool; and a valve disposed on the circulation pipe to change the direction of seawater supplied into the circulation pipe from the collection pool.

MODE FOR INVENTION

Figure 1:
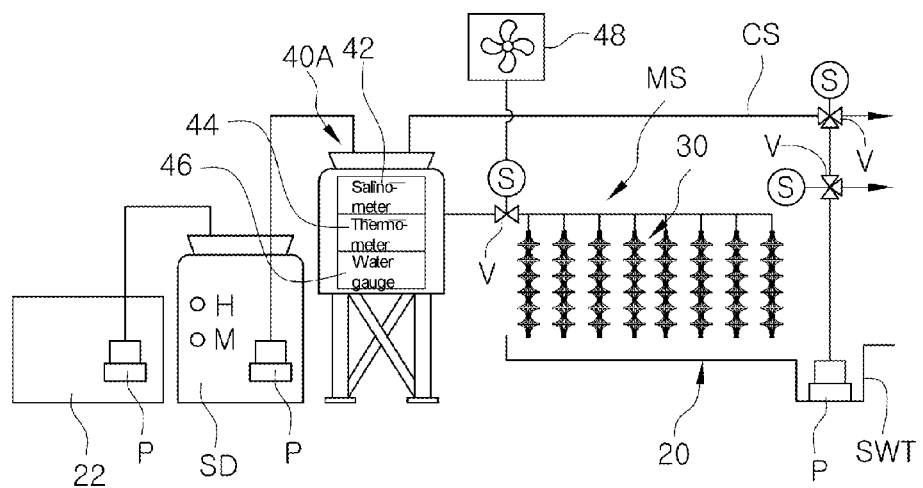
FIG. 1 is a view schematically showing the structure of a salt production automation system utilizing three-dimensionally structured evaporation fields according to the present invention.
Figure 2:
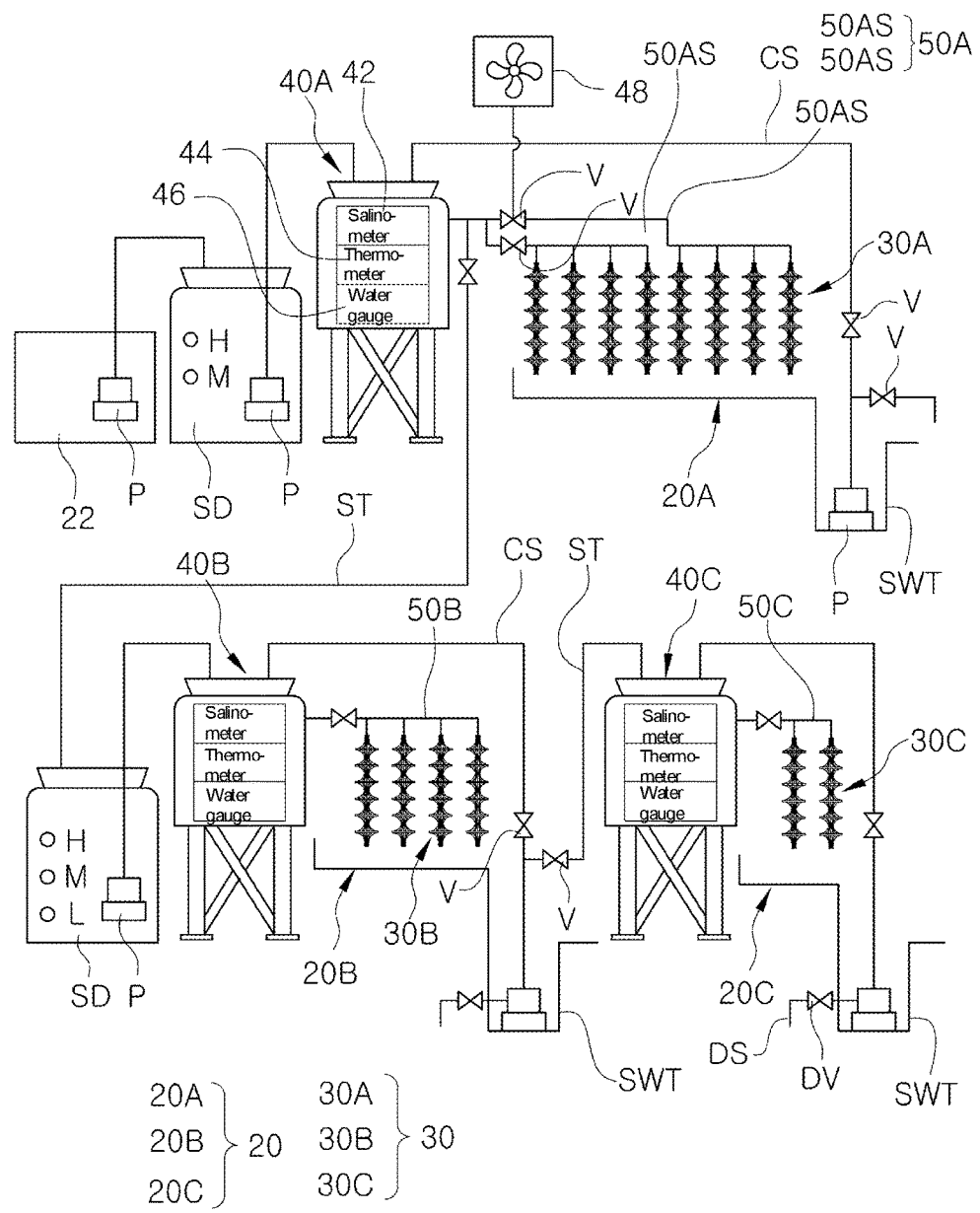
FIG. 2 is a view schematically showing the structure when a plurality of evaporation fields that are main parts of the present invention are installed.

Referring to the figures, a salt production automation system utilizing three-dimensionally structured evaporation fields of the present invention includes: an evaporation field 20 having a retention pond; a plurality of evaporation members 30 three-dimensionally disposed in the evaporation field 20 to allow seawater to flow down; a seawater supply unit supplying seawater to the evaporation members 30 so that the seawater flows down on the evaporation members 30; and a seawater circulation unit supplying again seawater to the evaporation members 30 from a seawater tank 40 of the seawater supply unit by returning seawater to the seawater tank 40 when the seawater flowing down in the retention pond of the evaporation field has a salt concentration equal to or less than a predetermined level. When the salt concentration of seawater at the evaporation field is a predetermined level (determined such that salt can be extracted, about 16~18%), the seawater is sent to the next step (the next evaporation field 20 or a salt crystallization field) for crystallizing (extracting) salt. That is, as shown in FIG. 1, the present invention is basically characterized in that it is possible to make salt concentration of seawater at which salt can be extracted by infinitely circulating seawater at one evaporation field 20.

The evaporation field 20 receives water (seawater), which is supplied to the evaporation members 30 from the seawater supply unit and flows down on the evaporation members 30, in the retention pond and the retention pond has a collection pool SWT for collecting the seawater flowing down on the evaporation members 30. The collection pool SWT is a water tank formed deeper than the bottom of the retention pond. Accordingly, the seawater flowing down into the retention pond from the evaporation members 30 flows and collects in the collection pool SWT. The seawater is salt water that has flowed down on the evaporation members 30, so it has higher salt concentration than the seawater drawn in the seawater tank 40 from the sea.

The seawater circulation unit of the present invention includes: a salinometer 42 for measuring the concentration of seawater collected in the collection pool SWT; a circulation pipe CS connected to the seawater tank 40 from the collection pool SWT; and a valve V disposed on the circulation pipe CS to change the direction of seawater supplied into the circulation pipe CS from the collection pool SWT. The valve V may be a 3-way valve and two valves are disposed on the circulation pipe CS. A first 3-way valve is connected to a drain (a waste water pipe) from the circulation pipe CS and a second 3-way valve is connected to the circulation pipe CS extending to the seawater tank 40. When the first 3-way valve is opened, rainwater mixed in the collection pool SWT or water that is not needed to crystallize (extract) salt is discharged to the drain, and when the second 3-way valve is opened to the seawater tank 40, the seawater collected in the collection pool SWT flows back into the seawater tank 40. The second 3-way valve is opened to the seawater tank 40, as described above, to recirculate seawater to the evaporation members 30 at the evaporation field 20 by returning seawater to the seawater tank 40 from the collection pool SWT.

The seawater supply unit includes a main supply pipe MS horizontally disposed in the evaporation field 20 and connected to the seawater tank 40 so that seawater flows down on the evaporation members 30 three-dimensionally disposed at the evaporation field 20. The main supply pipe MS has seawater supply holes formed through the side facing the evaporation members 30. The main supply pipe MS functions as a nozzle for supplying seawater to the evaporation members 30.

A valve V is disposed on the main supply pipe MS and an anemometer 48 for adjusting opening/closing of the valve V, depending on a wind speed, is connected to the valve V. The main supply pipe MS is connected to the seawater tank 40 and the anemometer 48 is disposed on the main supply pipe MS. The anemometer 48 senses whether a wind speed is too high or appropriate to adjust opening/closing of the valve V on the main supply pipe MS in preparation for the possibility that seawater is blown by strong wind. When the anemometer 48 determines that the intensity of wind is appropriate, seawater is supplied to the evaporation members 30 by opening the valve V on the main supply pipe MS, but when it is determined that wind is too strong, a loss of seawater is prevented by closing the valve V on the main supply pipe MS. A loss of energy is also reduced by stopping the operation for supplying seawater in addition to the function of preventing a loss of seawater.

Figure 4:
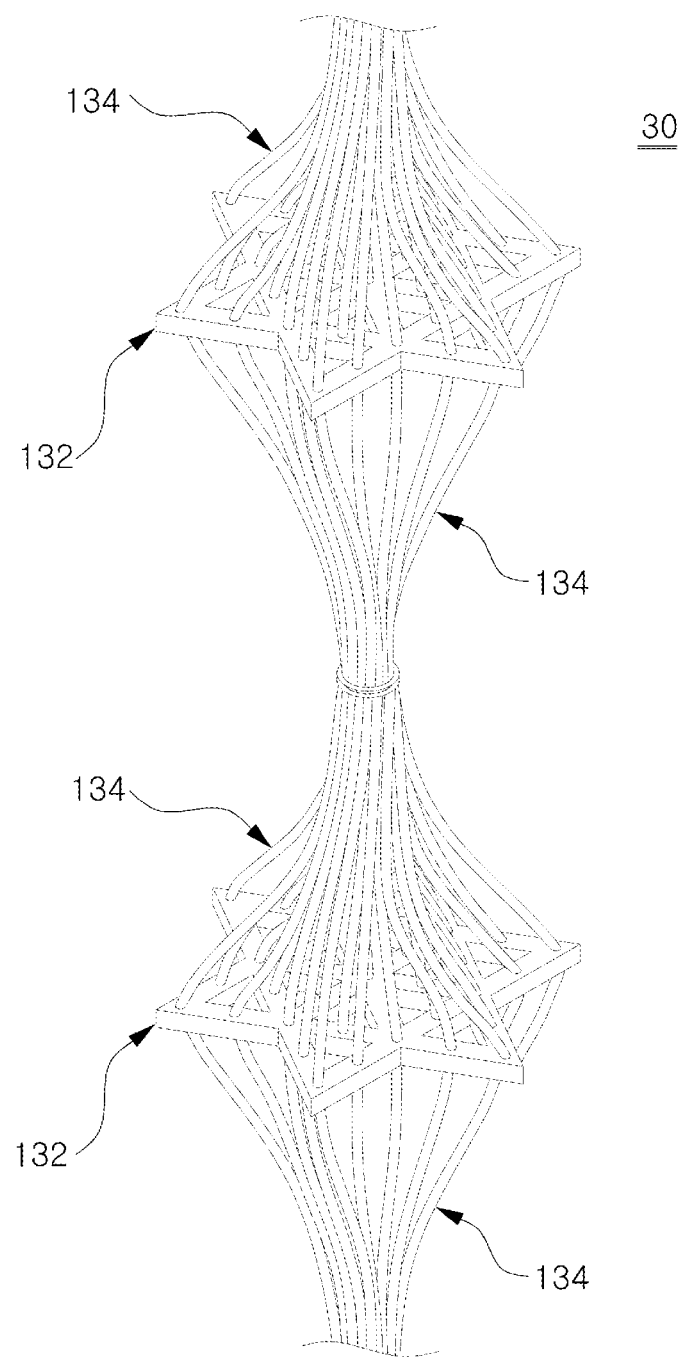
FIG. 4 is an enlarged perspective view showing a portion of the structure of an evaporation module that is an example of an evaporation member of the present invention.

According to the present invention, at least two or more seawater tanks 40 are disposed at the evaporation field 20 and connected to each other through the main supply pipe MS and the positions from which seawater is supplied from the seawater tanks 40 are higher than the tops of the evaporation members 30 and seawater is kept in the seawater tanks 40. Accordingly, seawater is uniformly supplied to all the evaporation members through the main supply pipe MS having a plurality of diverging lines. That is, when the evaporation field 20 is large, the seawater tanks 40 having a seawater supply position higher than the tops of the evaporation members 30 are disposed some places and the main supply pipe MS connected to the seawater tanks 30 is installed at necessary positions, whereby it is possible to uniformly supply seawater to all the evaporation members 30 without a specific power source by allowing the seawater to naturally drop. The evaporation member 30 shown in FIG. 4 is an evaporation rope module composed of a plurality of evaporation ropes 134 held by a holder 132 with gaps therebetween. The evaporation rope module should be understood as a kind of evaporation member 30 used in the present invention so that seawater can evaporate while flowing down on it.

Figure 3:
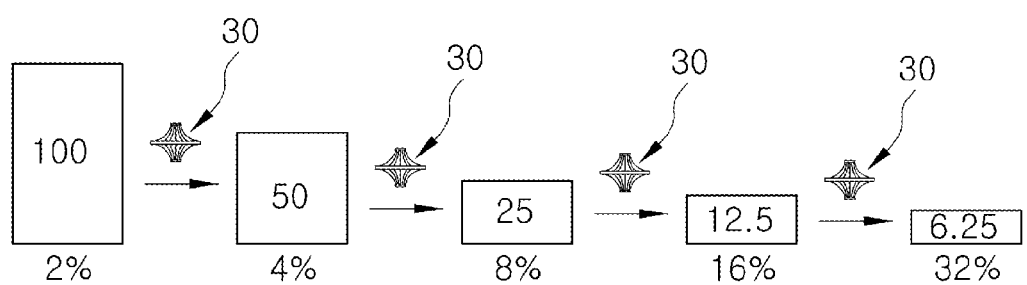
FIG. 3 is a view conceptually showing an evaporation process of seawater and a process of adjusting the concentration of salt according to the present invention.

The system including a single evaporation field 20 shown in FIG. 1 may be a basic type. According to this basic system, when seawater is infinitely re-supplied to the evaporation members 30, the salt concentration of the seawater increases up to a level required for extracting salt. FIG. 3 shows a process in which seawater of 100 tons is infinitely re-supplied (circulated) to evaporation members 30, so the amount of the seawater gradually decreases and the salt concentration of the seawater gradually increases. That is, referring to FIG. 3, when seawater is circulated first through the evaporation ropes 134, the amount of the seawater decreases to 50 tons and the salt concentration of the seawater increases up to 4% from 2% that is the initial salt concentration. When the seawater is circulated secondarily to the evaporation members 30, the amount of the seawater decreases to 25 tons and the salt concentration becomes 8%. When the seawater is circulated thirdly to the evaporation members 30, the amount of the seawater becomes 15.5 tons and the salt concentration becomes 16%. When the seawater is circulated fourthly to the evaporation members 30, the amount of seawater becomes 6.25 tons and the salt concentration becomes 32%. The main characteristic of the basic system is to gradually decrease the amount of seawater and gradually increase the salt concentration of seawater by infinitely circulating seawater at one evaporation field 20. The seawater tank 40 in the basic system also includes a salinometer 42, a thermometer 44, and a water gauge 46 (leveler).

The salt production automation system utilizing three-dimensionally structured evaporation fields of the present invention has a considerably improved structure, as compared with existing equipment for producing salt by evaporating seawater at salt farms and includes a start evaporation field 20A and a start evaporation member 30A, a middle sequence evaporation field 20B and a middle sequence evaporation member 30B, and a sequence evaporation member 20C and a sequence evaporation member 30C as most essential parts. According to the system, when seawater is supplied to a plurality of evaporation members 30 (seawater evaporation members) that are three-dimensionally installed, the sweater flows down on the evaporation members 30 vertically extending with a gap therebetween, whereby evaporation of the seawater is accelerated. Further, at least two to three or more evaporation members 30 are installed at the seawater evaporation fields 20 and the numbers of the evaporation members 30 three-dimensionally installed at each of the seawater evaporation fields 20 are gradually decreased, whereby it is possible to maximally quickly produce condensed water having appropriate concentration and maximize the speed of extracting salt (particularly, natural salt). Furthermore, it is possible to sufficiently obtain a desired amount of salt even from a small site, so it is possible to achieving several effects including extracting a sufficient amount of salt even from a relatively small area, According to the present invention, the evaporation members 30 are evaporation modules 130 each composed of a plurality of evaporation ropes 134 vertically extending with gaps therebetween and gathered by holders 132 so that seawater evaporates while flowing down on the evaporation ropes 132 of the evaporation modules 130, so the present invention may be referred to as a rope salt automation system. Obviously, in the present invention, common fiber threads, common ropes, and fabrics other than the evaporation rope modules 130 may be uses as long as they allow seawater to evaporate while flowing down thereon. The important configuration of the present invention is further characterized by providing the evaporation fields 20 at several places (at least, two to three or more places) and vertically installing the evaporators 30 at each of the evaporation fields to form a plurality of three-dimensionally structured evaporation fields 20 such that seawater circulates the three-dimensionally structured evaporation fields 20, whereby it is possible to maximize the evaporation speed of seawater by minimizing an evaporation surface area. Further, since the evaporation speed of seawater is maximized, it is possible to minimize the time for producing salt and maximize the output of salt. That is, the salt concentration is increased by infinitely circulating seawater in the system including a single evaporation field 20, but a multistage system that sequentially increase the salt concentration is achieved by connecting n basic systems.

To this end, the salt production automation system utilizing three-dimensionally structured evaporation fields of the present invention includes the start evaporation field 20A, the middle sequence evaporation field 20B, the sequence evaporation field 20C, a plurality of smart evaporation members 30A three-dimensionally installed at the middle sequence evaporation field 20A, a plurality of middle sequence evaporation members 30B three-dimensionally installed a the middle sequence evaporation field 20B, a plurality of sequence evaporation members 30C three-dimensionally installed at the sequence evaporation field 20C, and a seawater supply unit for supplying seawater to the start evaporation members 30A, the middle sequence evaporation members 30B, and the sequence evaporation members 30C, in which the numbers of the evaporation members 30 are sequentially decreased as it goes from the foremost evaporation field 20 to the latter evaporation fields 20. That is, the number of the start evaporation members 30A at the start evaporation field 20A is smaller than the number of the middle sequence evaporation members 30B at the middle sequence evaporation field 20B, and the number of middle sequence evaporation members 30B at the middle sequence evaporation field 20B is smaller than the number of sequence evaporation members 30C at the sequence evaporation field 20C. As seawater flows from a former evaporation field 20 to a latter evaporation field 20, the amount of the seawater decreases and the salt concentration of the seawater gradually increases, so the number of evaporation members 30 at the latter evaporation field 20 can be reduced as compared with the number of evaporation members 30A at the former evaporation field 20.

The start evaporation members 30A, the middle sequence evaporation members 30B, and the sequence evaporation members 30C are vertically disposed and arranged front and rear and left and right at the start evaporation field 20A, the middle sequence evaporation field 20B, and the sequence evaporation field 20C, respectively, in three-dimensional structures.

In the present invention, the evaporation field 20 to which seawater is supplied first may be the start evaporation field 20A, the evaporation field 20 to which seawater is finally supplied may be the sequence evaporation field, and the evaporation field 20 between the start evaporation field 20A and the sequence evaporation field 20C may be the middle sequence evaporation field 20B. The evaporation fields may be formed in three evaporation fields 20A of first, second, and third evaporation fields, or according to circumstances, they may be formed in two evaporation fields 20 or four evaporation fields 20. It should be understood that the evaporation fields 20 may be reduced, if necessary, in the present invention. That is, in the present invention, the start evaporation field 20A means the evaporation field 20 where seawater is supplied and starts to evaporate and the sequence evaporation field 20C means the evaporation field where seawater that has evaporated at the start evaporation field 20A continuously flows and evaporates.

Although the middle sequence evaporation field 20B is disposed between the start evaporation field 20A and the sequence evaporation 20C in an embodiment of the present invention, the start evaporation field 20A, the middle sequence evaporation field 20B, and the sequence evaporation field 20C are hereafter referred to as a first evaporation field, a second evaporation field, and a third evaporation, respectively, for the convenience of description. Further, the start evaporation members 30A, the middle sequence evaporation members 30B, and the sequence evaporation members 30C are referred to as first sector evaporation members 30, second sector evaporation members 30, and third sector evaporation members 30, respectively.

A reservoir 22 may be formed at a side of the first evaporation field in the present invention. The reservoir 22 is provided to keep seawater and supply the seawater to the seawater tank 40 at the first evaporation field. Seawater may be directly supplied to the seawater tank 40 without the reservoir 22. The start seawater tank 40A at the first evaporation field is referred to as a first seawater tank hereafter. The middle sequence seawater tank 40B and the sequence seawater tank 40C at the second evaporation field and the third evaporation field to be described bellow are respectively referred to as a second seawater tank and a third seawater tank.

The first seawater tank, the second seawater tank, and the third seawater tank are higher than the tops of the evaporation members 30. It should be understood that, in the following description, the first seawater tank, the second seawater tank, and the third seawater tank may be referred to as seawater tanks in combination for the convenience of description.

It may be possible to send seawater to a latter seawater tank and supply new seawater to a former seawater tank 40 when seawater reduces to the middle height M in the seawater tank 40, or the seawater tanks 40 may be immediately filled with seawater when they are short of seawater. When the seawater tanks 40 are short of seawater, they may be unconditionally filled with seawater to the maximum level.

An auxiliary tank for keeping seawater to be supplied to the seawater tanks 40 is provided. The auxiliary tank has a plurality of chambers divided by separators, so seawater sequentially flows to the first compartment to next compartments. The auxiliary tank is configured such that seawater flows to the next compartment after foreign substances in the seawater are deposited in the former compartment. This case substantially means that foreign substances in seawater are filtered through the compartments, so it is possible to prevent foreign substances from being mixed in salt when producing salt. Further, since foreign substances are not mixed in salt, it can contribute to producing high-quality salt. Obviously, the auxiliary tank may be equipped with a filter for filtering foreign substances such as soil or dust in seawater, but when the inside of the auxiliary tank is divided into several compartments so that foreign substances in seawater sequentially flow from the front compartment to the latter compartments, the effect of filtering foreign substances in seawater is increased.

The bottoms of the seawater tanks 40 may be positioned higher than the tops of the evaporation members 30. The middle portions of the seawater tanks 40 may be positioned higher than the tops of the evaporation members 30. In detail, the seawater tanks 40 are positioned higher than the tops of the evaporation members 30, the supply pipes for supplying seawater to the evaporation members 30 are also positioned higher than the tops of the evaporation members 30, and the seawater tanks 40 are positioned higher than the supply pipes. The supply pipes are disposed horizontally over the tops of the evaporation members 30 and the bottoms of the seawater tanks 40 are positioned higher than the supply pipes. The middle portions of the seawater tanks 40 may be positioned higher than the supply pipes. Accordingly, the seawater tanks 40 are positioned higher than the tops of the evaporation members 30. The supply pipes have seawater supply holes at positions corresponding to the evaporation members 30. Accordingly, seawater is supplied into the supply pipes from the seawater tank 40, is discharged to the evaporation members 30 through the seawater supply pipe, and flows down on the evaporation members 30 from the tops to the bottom of the evaporation members 30.

Seawater is supplied to the first evaporation members from the first seawater tank and evaporates while flowing down on the evaporation members. The seawater that has flowed down on the first evaporation members is returned to the first seawater tank through a circulation pipe CS, so the process of evaporating seawater is performed in this way. In this process, the amount of seawater returned to the first seawater tank reduces to about a half the initial amount by evaporation, the salt concentration of the seawater becomes 4% (4 degrees) from 2% (2 degrees). In this process, the valve V (solenoid valve V) disposed between the first seawater tank and a start seawater supply pipe 50A (hereafter, the start seawater supply pipe 50A is referred to as a first seawater supply pipe) is closed while the seawater flows down on the first evaporation members so that the seawater is evaporated well by sunlight. If seawater continuously flows down on the first evaporation members, the sweater may not evaporate well on the first evaporation members, so the valve V is temporarily closed while the seawater flows down on the first evaporation members so that the seawater can evaporate well while flowing down on the first evaporation members. That is, the layer of seawater flowing down on the first evaporation members is maintained at an appropriate thickness so that the seawater can evaporate well on the first evaporation members. A valve V is disposed on the first seawater supply pipe for supplying seawater from the first seawater tank to the first evaporation members and is temporarily opened and closed so that seawater flowing down on the first evaporation members evaporates well. In other words, supplying and stopping seawater to the first evaporation members are temporarily repeated to prevent a problem with the seawater flowing down on the evaporation members.

This operation occurs in the same way at the second evaporation field and the third evaporation field, thereby increasing efficiency of evaporating seawater. That is, the layers of seawater flowing down on the second evaporation members and the third evaporation members are maintained at an appropriate thickness by temporarily opening and closing valves respectively between the second and third seawater tanks and a middle sequence seawater supply pipe 50B (hereafter, the middle sequence seawater supply pipe 50B is referred to as a second seawater supply pipe) and a sequence seawater supply pipe 50C (hereafter, the sequence seawater supply pipe 50C is referred to as a third seawater supply pipe) so that seawater evaporates well while flowing down on the second evaporation members and the third evaporation members, similar to the first evaporation field in which seawater evaporates well while flowing down on the first evaporation members.

The present invention having the configuration described above is characterized in that the system quickly and sequentially increases the salt concentration by increasing the evaporation speed of seawater by circulating the seawater through a plurality of evaporation fields 20 and a plurality of evaporation members 30. In the present invention, evaporation rope modules 130 are employed as the evaporation members 30, so seawater evaporates while flowing down on the evaporation ropes 134 of the evaporation rope modules 130 at each of the evaporation fields 20. Obviously, the evaporation rope module 130 is an example of the evaporation member 30 and objects such as a fabric or a net, other than the evaporation rope module 130, may be used as the evaporation member 30 as long as it can absorb (soak) seawater and then allows it to evaporate from the surface.

Further, the seawater tanks 40 each includes a salinometer 42, so seawater can be sent to later seawater tanks 40 after salinity is measured. That is, the salinometers 42 are disposed in the path for supplying seawater to the evaporation members 30 so that seawater can automatically flow to the evaporation members 40 at the next evaporation field when the salt concentration of the seawater is a predetermined level or more.

The first seawater tank has a salinometer 42, so when the salt concentration of seawater is over 4% in the first seawater tank, the seawater is sent to the next second seawater tank. A seawater delivery pipe is connected to the first seawater tank and is connected the auxiliary tank of the second seawater tank and a valve V (solenoid valve V) is disposed on the seawater delivery pipe. Accordingly, when the salt concentration of the sweater in the first seawater tank is 4% or more, the salinometer 42 of the first seawater tank senses it and the valve V is opened. As the valve V is opened, the seawater with salt concentration of 4% or more is sent to the auxiliary tank of the second seawater tank from the first seawater tank. The seawater delivery line is directly connected between the first seawater tank and the second seawater tank, so seawater with salt concentration of 4% or more can be directly sent to the second seawater tank from the first seawater tank.

Further, the second seawater tank also has a salinometer 42, so when the salt concentration of seawater is over 8% in the second seawater tank, the seawater is sent to the next third seawater tank. A seawater delivery pipe is connected to the second seawater tank and is connected the auxiliary tank of the third seawater tank and a valve V (solenoid valve V) is disposed on the seawater delivery pipe. Accordingly, when the salt concentration of the sweater in the second seawater tank is 8% or more, the salinometer 42 of the second seawater tank senses it and the valve V is opened. As the valve V is opened, the seawater with salt concentration of 8% or more is sent to the auxiliary tank of the third seawater tank from the second seawater tank. In this configuration, the circulation pipe CS at the second evaporation field has a seawater delivery pipe, the seawater delivery pipe is connected to the auxiliary tank of the second seawater tank, and a valve V (solenoid valve V) is disposed on the seawater delivery pipe, so when the valve V is opened, seawater with salt concentration of 8% or more is sent to the auxiliary tank of the third seawater tank from the second seawater tank. The seawater delivery line is directly connected between the second seawater tank and the third seawater tank, so seawater with salt concentration of 8% or more can be directly sent to the third seawater tank from the second seawater tank.

The third seawater tank also has a salinometer 42, so when the salt concentration of seawater is over 16% in the third seawater tank, the seawater is sent to the next crystallization field. A seawater delivery pipe is connected to the third seawater tank and is connected the next crystallization field and a valve V (solenoid valve V) is disposed on the seawater delivery pipe. Accordingly, when the salt concentration of the sweater in the third seawater tank is 16% or more, the salinometer 42 of the third seawater tank senses it and the valve V is opened. As the valve V is opened, the seawater with salt concentration of 16% or more is sent to the next crystallization field from the third seawater tank. In this configuration, the circulation pipe CS at the third evaporation field has a seawater delivery pipe, the seawater delivery pipe is connected to the crystallization field, and a valve V (solenoid valve V) is disposed on the seawater delivery pipe, so when the valve V is opened, seawater with salt concentration of 16% or more is sent to the crystallization field from the third seawater tank. Meanwhile, a seawater delivery pipe may be directly connected between the third seawater tank and the crystallization field, so the sweater with salt concentration of 16% or more may be directly sent to the crystallization field from the third seawater tank.

The valve V connected to the first seawater tank between the circulation pipe CS and the seawater delivery pipe at the first evaporation field, the drain valve V connected to the collection pool SWT of the first evaporation field, the valve V connected to the second seawater tank between the circulation pipe CS and the seawater delivery pipe at the second evaporation field, the drain valve V connected to the collection pool SWT at the second evaporation field, the valve connected to the third seawater tank between the circulation pipe CS and the seawater delivery pipe at the third evaporation field, and the drain valve V connected to the collection pool SWT at the third evaporation field are all 3-way valves.

Accordingly, seawater can be returned to the first seawater tank through the circulation pipe CS or sent to the next second seawater tank by the 3-way valves at the first evaporation field, seawater can be returned to the second seawater tank through the circulation pipe CS or sent to the next third seawater tank by the 3-way valves at the second evaporation field, and seawater can be returned to the third seawater tank through the circulation pipe CS or sent to the next crystallization field by the 3-way valves at the third evaporation field. Since the drain valves V respectively connected to the collection pools SWT at the first, second, and third evaporation fields are 3-way valves, a mixture of rainwater and seawater can be drained by the drain valves V at the first, second, and third evaporation fields.

According to the present invention, the salt concentration is increased by circulating raw seawater (drawn from the sea) at the first evaporation field, the salt concentration is further increased by circulating the seawater sent from the first evaporation field at the second evaporation field, and the salt concentration is further increased by circulating the seawater sent from the second evaporation field at the third evaporation field, whereby seawater with salt concentration that can minimize the time for extracting salt is obtained and then supplied to a crystallization field so that salt is extracted at the crystallization field. The salt concentration is increased from about 2% to about 4-5% by evaporation 50% of seawater at the first evaporation field, the salt concentration is further increased to about 7-8% by evaporating 50% of the seawater again at the second evaporation field, the salt concentration is further increased to about 16-18% by evaporating 50% of the seawater again at the third evaporation field, and then the seawater with salt concentration of 16-18% is supplied to a crystallization field from the third evaporation field, whereby salt is extracted at the crystallization field. If seawater of 100 tons is supplied to the first evaporation field, the seawater reduces to 50 tons by evaporating through the first evaporation members at the first evaporation field, and if seawater of 50 tons is supplied from the first evaporation field to the second evaporation field is 50 tons, the seawater reduces to 25 tons by evaporating at the second evaporation field.

Accordingly, as compared with the existing facilities that take considerable time to produce salt from seawater, according to the present invention, seawater is sequentially supplied to a plurality of separated evaporation fields 20 and evaporation members 30 (the first evaporation member to the third evaporation member) are three-dimensionally installed at each of the evaporation fields 20, so the evaporation speed of seawater is increased and the time for producing salt is considerably reduced. Therefore, it is possible to reduce the size for the facilities for extracting salt at a salt farm and maximize efficiency and economic efficiency of producing salt.

It took fifteen days to over one month to produce salt in the related art, but according to the present invention, it takes only two to three hours to produce salt. Accordingly, the present invention can be considered as being meaningful in terms of considerably quick production of salt in comparison to the related art. Further, since a large amount of salt is quickly produced in comparison to the related art, it is possible to save time, personnel expenses, and manpower, which is very advantageous in teams of economic efficiency.

The first, second, and third evaporation fields are provided in the present invention, and if the cycle that evaporates seawater through the first, second, and third evaporation fields is one cycle, the evaporation speed of seawater during one cycle is remarkably increased in comparison to the related art. Therefore, according to the present invention, it can be expected to considerably increase the output of salt and the production speed of salt, as compared with the related art, so innovative effect that could not be accomplished in the related art is provided.

Further, since the sizes of the seawater evaporation fields 20 are reduced in preparation for the evaporation amount of seawater and the numbers of the evaporation members 30 are also decreased in preparation for the amount of seawater after evaporating at the evaporation fields 20, the evaporation speed of seawater is increased, so it is possible to quickly produce salt and minimize the scale of a size for extracting salt. That is, the evaporation speed of seawater and the production speed of salt are remarkably increased and the site for extracting salt is significantly reduced, as compared with the related art.

Further, the seawater tanks 40 are higher than the tops of the evaporation members 30 in the present invention. Since the seawater tanks 40 are supported by support frames higher than the tops of the evaporation members 30 and than the seawater supply pipes for supplying seawater to the evaporation members 30, seawater supplied to the seawater supply pipes from the seawater tanks 40 can be uniformly discharged through the seawater discharge holes of the seawater supply pipes. Accordingly, it is possible to prevent the problem that seawater is excessively supplied to some of the evaporation members 30 and insufficiently supplied to other evaporation members 30. Since the seawater tanks 40 are positioned higher than the tops of the evaporation members 30, the seawater flowing through the seawater supply pipes naturally drops through the seawater discharge holes, thereby preventing the problem that seawater is not uniformly supplied to all the evaporation members 30. Uniformly supplying seawater to all the evaporation members 30 means maximization of the evaporation efficiency of seawater, so it can be considered as being meaningful that the seawater tanks 40 are positioned higher than the tops of the evaporation members 30.

Further, the seawater supply pipe (that is, the start sector seawater supply pipe) at the first evaporation field that is the largest in the present invention is composed of at least two separated seawater supply pipes 50AS and a valve (V) (solenoid valve V) is provided for each of the separated seawater supply pipes 50AS, so it is more effective in uniformly supplying seawater to all the evaporation members 30. Since seawater is divided by the separate seawater supply pipes 50AS, it is possible to more efficiently uniformly supply seawater to the tops of all the evaporation members 30.

Further, a circulation pipe CS is disposed at each of the evaporation fields 20 so that seawater is circulated through the circulation pipe CS at each of the evaporation fields 20 in the present invention, whereby it is possible to easily adjust the concentration of seawater for each of the evaporation fields 20. That is, when the salt concentration of seawater in the collection pool SWT at the first evaporation field does not reach 4%, seawater is pumped to the circulation pipe CS and sent back to the first seawater tank by a pump P and the seawater sent to the first seawater tank flows into the first seawater supply pipe (start seawater supply pipe 50A) comes out through the seawater discharge holes 50H to flow down from the tops of the first evaporation members.

Accordingly, it is possible to smoothly and easily adjust the salt concentration of seawater by circulating the seawater at the first evaporation field. Similarly, it is possible to smoothly and easily adjust the concentration of seawater at the second evaporation field and the third evaporation field. Seawater is sent to the evaporation members 30 for evaporation through the circulation pipe CS and the seawater tank 40 from the collection pool SWT at each of the evaporation field, so it is easier to adjust the salt concentration of seawater.

Further, according to the present invention, a valve V (solenoid valve V) is disposed on each of the seawater supply pipes for supplying seawater to the evaporation fields and the amount of seawater flowing down on the evaporation members 30 is adjusted in accordance with the degrees of opening/closing the valves v. Further, the degrees of opening/closing the valves are controlled in accordance with the wind speed measured by the anemometers 48 so the amount of seawater that is supplied to the evaporation members 30 is automatically adjusted. Accordingly, it is possible to considerably precisely implement optimal conditions for evaporating seawater flowing down on the evaporation members 30. Further, it is also possible to easily and automatically adjust the amount of seawater flowing down on the evaporation members so that the seawater can optimally evaporate. The anemometers 48 can be considered as being considerably meaningful in terms that it is possible to automatically adjust the amount of seawater flowing down on the evaporation members 30 by adjusting the degrees of opening/closing the valves V using the anemometers 48.

Further, according to the present invention, since the drain pipes DS are provided at the collection pools SWT at the first, second, and third evaporation fields, and when it rains, all the parts are stopped and water (including a predetermined amount of seawater) flowing into the collection pools SWT is discharged outside the first, second, and third evaporation fields through the drain pipes DS and the drain valves V and DV using the pump P. Accordingly, it is possible to prevent the influence from rainwater that interferes with production of salt.

A salt farm includes the start evaporation field 20A, the middle sequence evaporation field 20B, and the sequence evaporation field 20C, so it is possible to minimize the waste of seawater from the salt farm. This is because most of seawater to be used is kept in the seawater tanks 40, so the salt farm is not influenced by rainwater. When rain stops, the work of evaporating seawater can be started again with the seawater stored in the seawater tanks 40, so the present invention can be efficiently operated almost without influence of rain. That is, according to the present invention, it is possible to evaporate seawater and adjust the concentration of seawater for producing salt without influence from rain by discharging water mixed with seawater through the drain valves V at the evaporation fields 20.

Further, according to the present invention, since it is possible to check in real time the salt concentration (salinity), the temperature, and the amount of seawater in the first, second, and third seawater tanks at the first, second, and third evaporation fields, it is more advantageous to increase the production efficiency of salt.

Meanwhile, the system of the present invention includes a display for showing the structures of the start evaporation field 20A, the middle sequence evaporation field 20B, the sequence evaporation field 20C, and the operating parts and a controller for controlling the components in response to signals for operating the operating parts shown on the display.

The operating parts include the pump for supplying seawater into the seawater tank 40 at the start evaporation field 20A, the valve V at the start evaporation field 20A, the pump for supplying seawater into the seawater tank 40 at the middle sequence evaporation field 20Ab, the valve V at the middle sequence evaporation field 20B, the pump for supplying seawater into the seawater tank 40 at the sequence evaporation field 20C, the valve V at the sequence evaporation field 20C, the anemometer 48, the temperature sensor, the flow sensor, the level sensor, and the pumps in the seawater reservoirs at the evaporation fields 20.

The display displays windows showing automatic operation and manual operation, so the system is operated in the automatic mode or the manual mode when the window showing the automatic operation or the manual operation is selected.

Further, the display shows the primary evaporation amount, the secondary evaporation amount, and the third evaporation amount. The primary evaporation amount means the evaporation amount of seawater at the first evaporation field, the secondary evaporation amount means the evaporation amount of seawater at the second evaporation field, and the third evaporation amount means the evaporation amount of seawater at the third evaporation field and a user can check and control the evaporation amount in real time.

Further, salinity, temperature, and level of seawater are shown in salinity, temperature, and level windows at corresponding portions of the first seawater tank, the second seawater tank, and the third seawater tank at the first, second, and third evaporation fields.

Further, the current wind speed is shown in a window by the anemometer 48 so that a user can check the window speed condition and control the system.

Accordingly, since it is possible to check and control the operation of the salt production automation system utilizing three-dimensionally structured evaporation fields (rope salt automation system) of the present invention through the display and the controller, it is possible to considerably improve the work efficiency.

Therefore, the basic characteristic of the present invention is to sequentially increase salt concentration by infinitely circulating seawater to the evaporation members 30 in a basic type, and another multistage system that continuously increases salt concentration is achieved by connecting n basic types. That is, it may be possible to adjust the salt concentration by infinitely circulating seawater in a basic type or it may be possible to continuously adjust the salt concentration in a multistage type by connecting n basic types. n evaporation fields 20 can be achieved by increasing the sequence evaporation field 20B between the start evaporation field 20A and the sequence evaporation field 20C as much as a necessary number.

INDUSTRIAL APPLICABILITY

The present invention can be considered as having industrial applicability in teams of providing a salt production automation system utilizing three-dimensionally structured evaporation fields, the system being capable of reducing a site area for salt farm equipment for extracting salt and increasing salt productivity by increasing the evaporation speed of seawater, using a plurality of seawater evaporation members that is three-dimensionally installed in a seawater evaporation field so that seawater evaporates while flowing down on the evaporation members.

The invention claimed is:

1. A salt production automation system utilizing three-dimensionally structured evaporation fields, the system comprising:
    an evaporation field having a retention pond;
    a plurality of evaporation members three-dimensionally disposed above the retention pond, seawater flowing down on the evaporation members;
    a collection pool for collecting the seawater flowing down on the evaporation members, the collection pool being provided at a height lower than that of the retention pond;
    a seawater supply unit having a main supply pipe horizontally disposed above the evaporation members, one end of the main supply pipe being coupled to the evaporation members, and the other end of the main supply pipe being coupled to a seawater tank, a valve disposed on the main supply pipe, and an anemometer connected to the valve and adjusting opening/closing of the valve, depending on a wind speed, so that the seawater is supplied from the seawater tank through the main supply pipe, flows down on the evaporation members, drops to the retention pond, and flows into the collection pool; and
    a seawater circulation unit returning the seawater of the collection pool to the seawater tank, when the seawater of the collection pool has salt concentration equal to or less than a predetermined level,
    wherein the seawater circulation unit includes: a salinometer for measuring a salt concentration of the seawater collected in the collection pool; a circulation pipe connected to the seawater tank from the collection pool; and a valve disposed on the circulation pipe to change a direction of seawater flowing in the circulation pipe.

2. The system of claim 1, wherein the seawater tank is disposed at a height higher than tops of the evaporation members.

3. The system of claim 1, wherein the evaporation field includes: a start evaporation field having a start retention pond and a start collection pool and a sequence evaporation field having a sequence retention pond and a sequence collection pool,
    wherein the evaporation members include:
    a plurality of start evaporation members three-dimensionally installed above the start retention pond; and
    a plurality of sequence evaporation members three-dimensionally installed above the sequence retention pond, and
    wherein the number of the sequence evaporation members is smaller than that of the start evaporation members.

4. The system of claim 3, wherein the start evaporation field is disposed at a height higher than that of the sequence evaporation field.

5. The system of claim 3, wherein a middle sequence evaporation field is further provided between the start evaporation field and the sequence evaporation field, the middle sequence evaporation field including a middle sequence retention pond and a middle sequence collection pool, the evaporation members further include: a plurality of middle sequence evaporation members three-dimensionally installed above the middle sequence retention pond; and
    the number of the middle sequence evaporation members is smaller than that of the start evaporation members.

6. The system of claim 5, wherein the middle sequence evaporation field includes a middle sequence seawater tank, the start seawater tank and the middle sequence seawater tank are connected to each other through a bypass pipe; and a solenoid valve is connected to the bypass pipe.

7. The system of claim 6, wherein the start evaporation field is connected to the middle sequence seawater tank through a first seawater delivery pipe having a valve, and the middle sequence evaporation field is connected to the sequence seawater tank through a second seawater delivery pipe having a valve.

8. The system of claim 5, wherein the middle sequence evaporation field includes two or more middle sequence evaporation fields.

9. The system of claim 3, wherein the seawater tank includes:
    a start seawater tank keeping the seawater to be supplied to the start evaporation members; and
    a sequence seawater tank keeping the seawater to be supplied to the sequence evaporation members,
    wherein the seawater supply unit includes:
    a start seawater supply pipe installed at the start evaporation field to supply the seawater kept in the start sweater tank to tops of the start evaporation members; and
    a sequence seawater supply pipe installed at the sequence evaporation field to supply the seawater kept in the sequence seawater tank to tops of the sequence evaporation members, and
    wherein the start seawater supply pipe and the sequence seawater supply pipes seawater discharge holes.

10. The system of claim 9, wherein the seawater circulation unit includes:
    a start seawater circulation unit returning the seawater of the start collection pool to the start seawater tank; and
    a sequence sweater circulation unit returning the seawater of the sequence collection pool to the sequence seawater tank.

11. The system of claim 10, wherein the start seawater supply pipe is composed of at least two separated seawater supply pipes; a solenoid valve disposed on each of the at least two separated seawater supply pipes;
    wherein the start circulation unit includes: a start pump disposed in the start collection pool and a start circulation pipe installed between the start pump and the start seawater tank; and
    wherein the sequence circulation unit includes: a sequence pump disposed in the sequence collection pool and a sequence circulation pipe installed between the sequence pump and the sequence seawater tank.

* * * * *